United States Patent [19]

Straitz, III

[11] 4,147,495

[45] Apr. 3, 1979

[54] WASTE GAS DISPERSION STACK

[76] Inventor: John F. Straitz, III, Elkins Park, Pa.

[21] Appl. No.: 845,562

[22] Filed: Oct. 26, 1977

[51] Int. Cl.² ............................................. F23D 13/20
[52] U.S. Cl. ...................................... 431/23; 431/29;
431/33; 431/145; 431/202
[58] Field of Search ...................... 431/23, 29, 30, 33,
431/121, 145, 202

[56] References Cited

U.S. PATENT DOCUMENTS

| | | | |
|---|---|---|---|
| 3,730,673 | 5/1973 | Straitz | 431/202 |
| 3,797,991 | 3/1974 | Straitz | 431/202 |
| 3,810,733 | 5/1974 | Reagan | 431/202 |
| 3,994,663 | 11/1976 | Reed | 431/202 |

*Primary Examiner*—Carroll B. Dority, Jr.

[57] ABSTRACT

Waste gas dispersion stacks are described, suitable for use on-shore and off-shore, for disposal of combustible gas without combustion by rapid dispersion into the atmosphere to reduce the waste gas concentration to below combustible or explosive levels, provisions being made to avoid ignition due to static electricity generation and to extinguish the flame by controlled utilization of an extinguishing medium if ignition should occur due to lightning or other causes. The stacks include single and multiple discharge pipes with diffuser or discharge heads for good mixing with air to provide a lean gas-air mixture.

14 Claims, 9 Drawing Figures

WASTE GAS DISPERSION STACK

BACKGROUND OF THE INVENTION

1. Field of the Invention

This invention relates to waste gas dispersion and more particularly to such dispersion by mixing with atmospheric air without combustion.

2. Description of the Prior Art

It has heretofore been proposed to discharge waste gas into the atmosphere through open vertical pipes with or without a shroud surrounding the discharge end of the pipe and to introduce a fire suppressing material, such as carbon dioxide, into the waste gas prior to discharge from the pipe. This has not proven satisfactory because of the likelihood of reignition upon discontinuance of the supply of the suppressing material.

It has also been proposed to supply a fire suppressing material, such as carbon dioxide, at the discharge end of the pipe and while this may render the combustion smokeless and not visible it does not, in fact, snuff out the flame.

No successful effect has been made, to my knowledge, prior to my invention in Fluidic Seals for which an application for U.S. Letters Patent was filed on July 15, 1977, Ser. No. 815,992 and now U.S. Pat. No. 4,092,908, to prevent ignition by static electricity generated by the waste gas flow.

In my prior U.S. Pat. No. 4,038,024 for Flare Stack Gas Burner there is disclosed a stack with a plurality of outwardly extending hollow vanes at the top with fixed inclined nozzles for discharge of combustible gas in flat streams for admixture with air to provide a hollow frusto-conical vortex combustion path to provide smokeless combustion. No other purpose was proposed or then intended but the structure there disclosed is useful for waste gas dispersal without combustion. In the structure of the present invention combustion is not desired and provisions are made to avoid the generation of static electricity and to introduce fire suppressing material to extinguish any combustion which might occur due to lightning or other causes.

SUMMARY OF THE INVENTION

In accordance with the invention waste gas dispersion stacks are provided, suitable for use on-shore and off-shore, for disposal of combustible waste gas without combustion by rapid dispersion into the atmosphere to reduce the waste gas concentration to below combustible or explosive levels, with provisions for rapid discharge into contact with atmospheric air for admixture therewith, for preventing generation of static electricity by liquid particles in the waste gas, and for controlled introduction into the waste gas of a fire suppressing material in the event of ignition of the waste gas.

It is the principal object of the invention to provide a waste gas dispersion stack which is effective for rapid and effective mixture of the waste gas with atmospheric air to reduce the concentration of the waste gas to a non-combustible or non-explosive level.

It is a further object of the invention to provide a waste gas dispersion stack with greatly reduced tendency to formation of static electricity which could cause ignition.

It is a further object of the invention to provide a waste gas dispersion stack with improved introduction and admixture of a fire suppressing material.

It is a further object of the invention to provide a waste gas dispersion stack with controlled introduction of a fire suppressing material into the waste gas being delivered for dispersion.

It is a further object of the invention to provide a waste gas dispersion stack having simple but effective controls for a fire suppressing material which is introduced into the waste gas being delivered for dispersion.

It is a further object of the invention to provide a waste gas dispersion stack with introduction of fire suppressing material and which may be automatically or manually controlled as desired.

It is a further object of the invention to provide a waste gas dispersion stack which is free from enclosures or shrouds which restrict the discharge.

It is a further object of the invention to provide a waste gas dispersion stack which can employ various fire suppressing materials for extinguishing any fire which may occur.

It is a further object of the invention to provide a waste gas dispersion stack with introduction of fire suppressing material into the waste gas being delivered for discharge and with high and low pressure supplies of fire suppressing material.

It is a further object of the invention to provide a waste gas dispersion stack which may incorporate a plurality of individual waste gas stacks in a tower and in which the individual stacks form legs of the tower.

It is a further object of the invention to provide a waste gas dispersion stack suitable for on-shore and off-shore use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
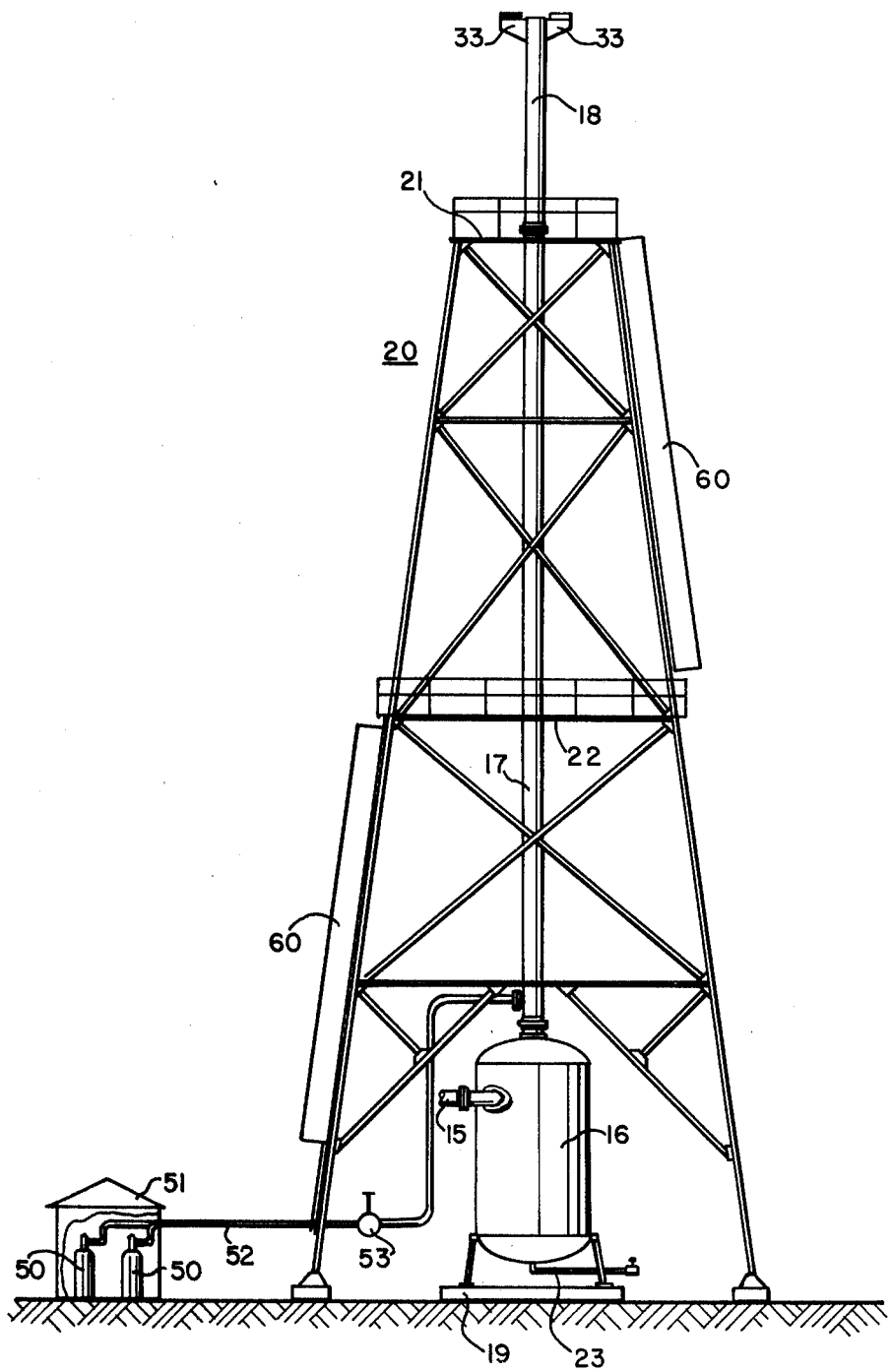
FIG. 1 is a vertical elevational view of one form of waste gas dispersion stack in accordance with the invention for on-shore use.

Referring now more particularly to the drawings in FIG. 1 a waste gas dispersion stack is shown which includes a supply connection 15 to a supply of waste gas, a knock-out drum 16 of conventional type for removal of liquid and liquid droplets carried with the waste gas delivered to the supply connection 15.

From the top of the drum 16 a vertical stack pipe 17 extends upwardly and has, at the upper end thereof, a discharge head 18.

The drum 16 can be supported on a foundation 19 and the pipe 17 and discharge head 18 can be supported in a tower 20 of a height determined by the height of the pipe 17 and head 18, and with access platforms 21 and 22 at desired elevations.

A liquid drum pipe 23 can be provided for removal of liquid from the drum 16.

Figure 3:
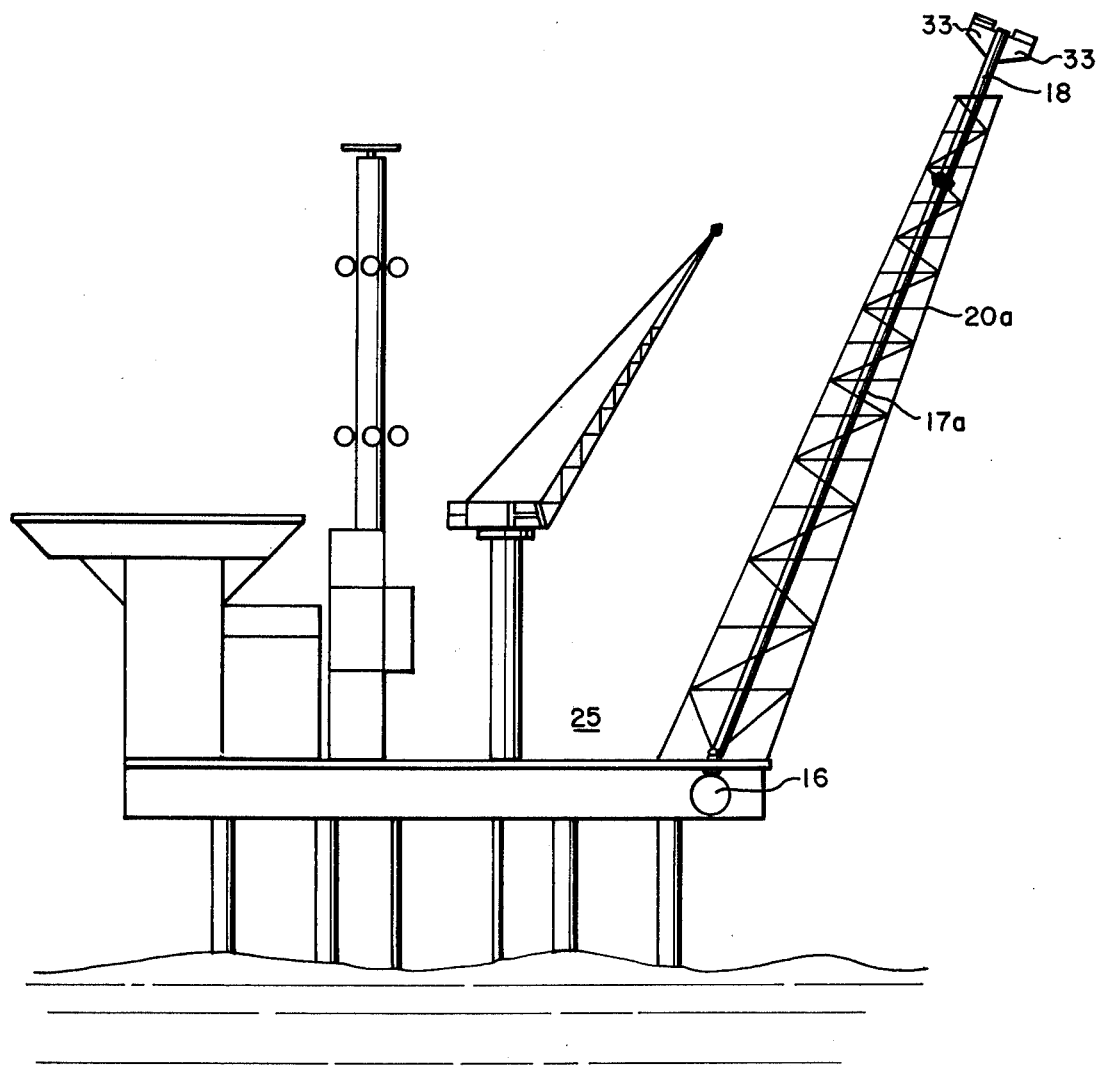
FIG. 3 is a vertical elevational view of another form of waste gas dispersion stack in accordance with the invention for off-shore use.

The stack shown in FIG. 1 is preferably for on-shore use but can be adapted to off-shore use as illustrated in FIG. 3. An off-shore platform is shown at 25 with a tower 20a inclined from the vertical and with an upright pipe 17a extending from a knock out drum 16a carried by the platform 25 and to which the waste gas for dispersion is supplied. The pipe 17a carries a discharge head 18 at its upper end.

Figure 6:
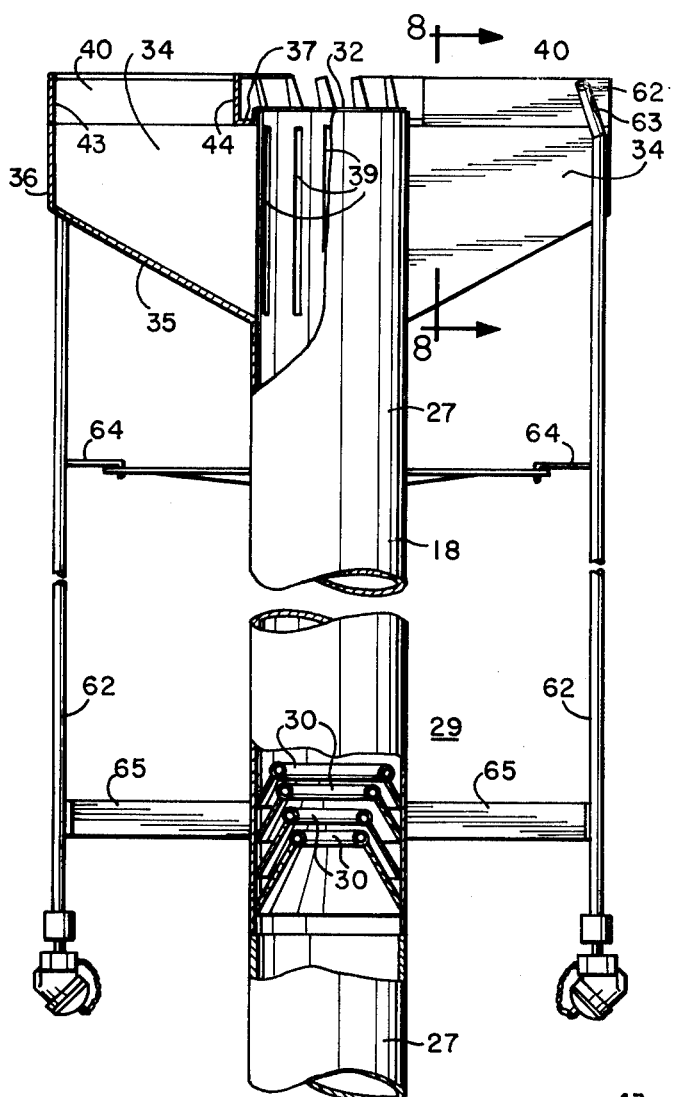
FIG. 6 is an enlarged view in elevation, parts being broken away to show the details of construction of a preferred form of discharge head.
Figure 8:
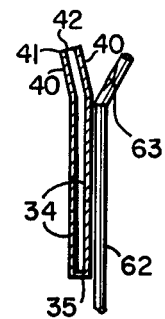
FIG. 8 is a fragmentary vertical sectional view taken approximately on the line 8—8 of FIG. 6.
Figure 7:
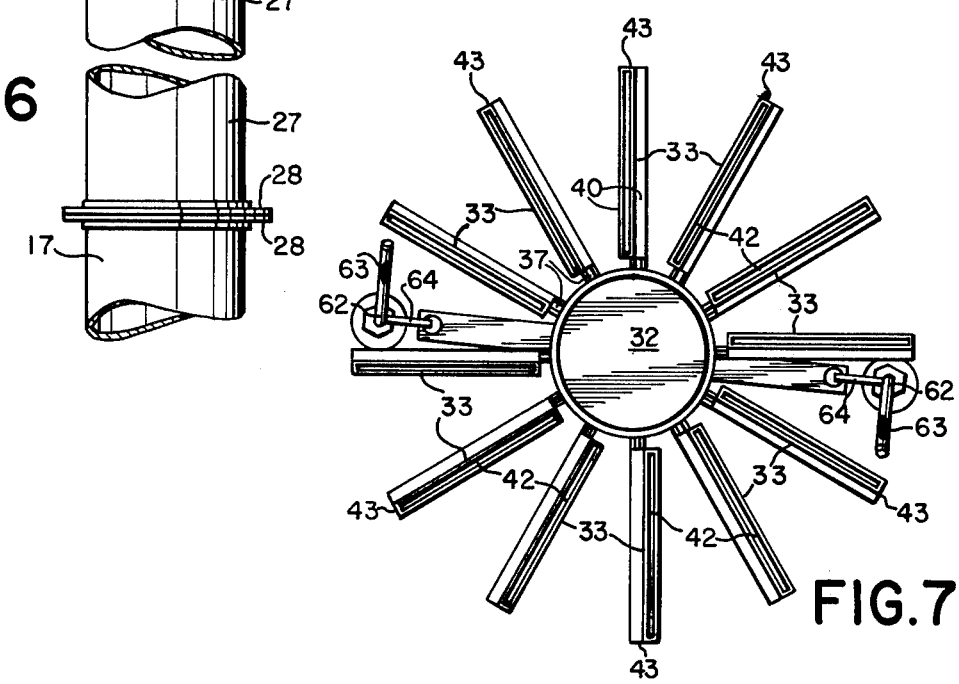
FIG. 7 is a top plan view of the discharge head shown in FIG. 6.

Referring now more particularly to FIGS. 6, 7 and 8, a preferred form of waste gas discharge head 18 is there illustrated.

The head 18 preferably includes a lower tubular portion 27 for detachable connection to the pipe 17 at flanges 28 for maintenance and replacement when required.

The tubular portion 27 also preferably has carried therein a fluidic seal or diode 29 such as is shown in my application for U.S. patent filed July 15, 1977, Ser. No. 815,992 now U.S. Pat. No. 4,092,908 issued June 6, 1978 and which permits of free outward flow over curved surfaces 30 which do not tend to generate static electricity if liquid particles are present but presents an obstacle to return or backward flow in the tubular portion 27 and in the pipe 17 whether occasioned by wind conditions or contraction by cooling of hot gas upstream in the system.

If there is no likelihood of the gas containing liquid droplets a fluidic diode as shown in my prior U.S. Pat. No. 3,730,673 may be employed.

The waste gases to be dispersed may in on-shore installations, consist of combustible gas, including hydrogen, methane or other waste hydrocarbon containing gases from oil refining and other chemical plant operations, and in off-shore installations may be natural gas.

The tubular portion 27 is closed at its upper end by a cover plate 32 which is secured in place.

A plurality of vanes 33 are provided secured to and preferably extending radially outwardly from the tubular portion 27. Each of the vanes 33 has spaced parallel vertical side walls 34, an outwardly extending upwardly inclined bottom wall 35, an outer vertical end wall 36, and an inner short horizontal connecting wall 38. The interiors of the vanes 33 are in communication with the interior of the pipe 27 through vertical openings 39 in the pipe 27.

The upper horizontal margins of the walls 34 have converging plates 40 secured thereto to provide inclined nozzles 41 with elongated nozzle openings 42. The outer ends of the nozzle wall plates 40 are closed by upper extension 43 of the end walls 36 and the inner ends of the nozzle wall plates 40 are closed by inner end wall plates 44.

In order to prevent burning of the waste gas a fire suppressing material may be introduced into the waste gas passing to the vanes 33 for dispersion. Any suitable material may be employed such as carbon dioxide gas, dry fire suppression chemical with nitrogen propellant, or halon.

A source of a fire suppression agent is shown as cylinders 50, housed in a small building 51 at the base of the tower 20, and connected by a pipe 52 with a manually controlled valve 53, for delivery into the pipe 17.

Figures 2, 4:
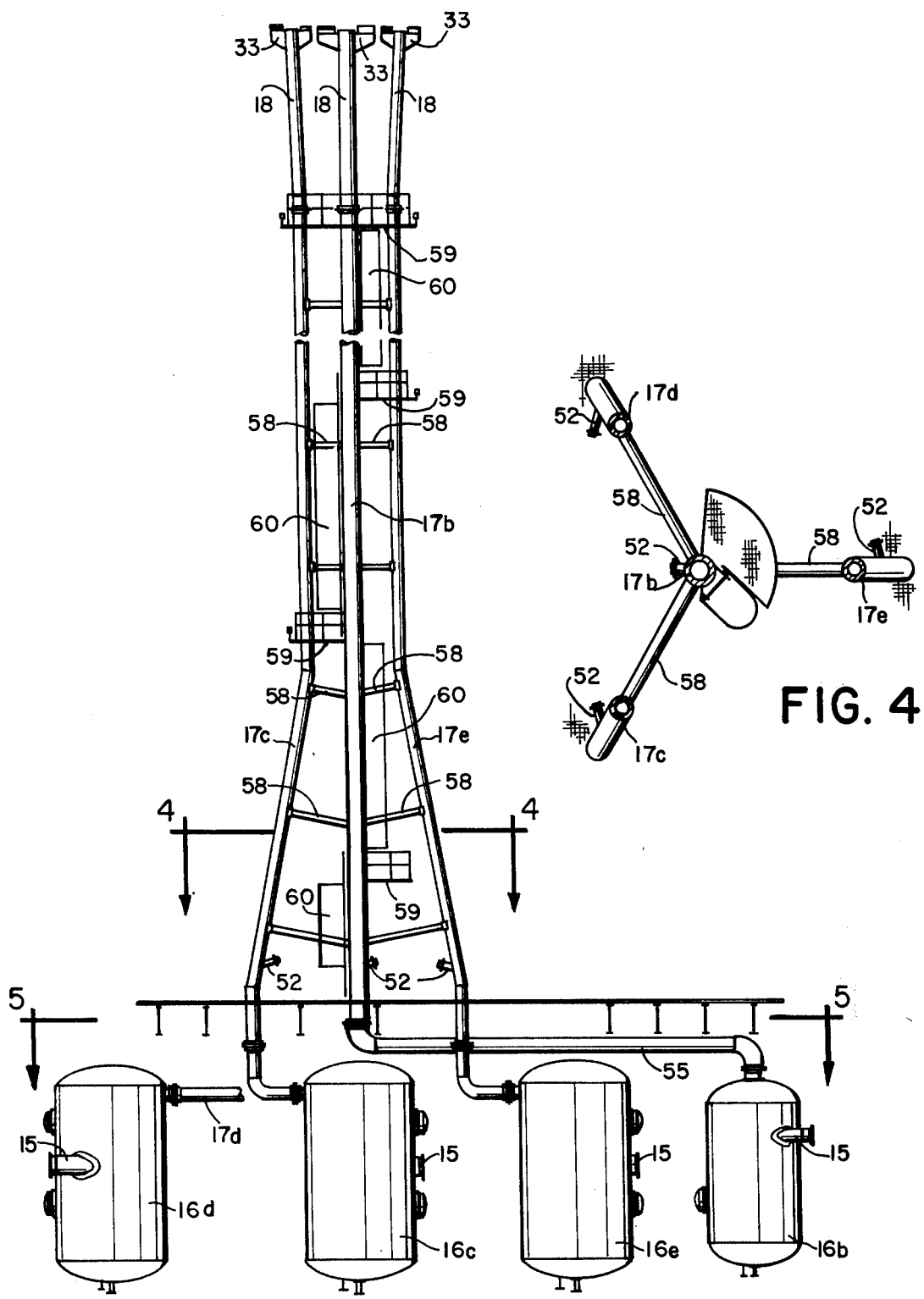
FIG. 2 is a vertical elevational view of another form of waste gas dispersion stack in accordance with the invention for on-shore or off-shore use, parts being shown in section to simplify the illustration.
FIG. 4 is a horizontal sectional view taken approximately on the line 4—4 of FIG. 2.
Figure 5:
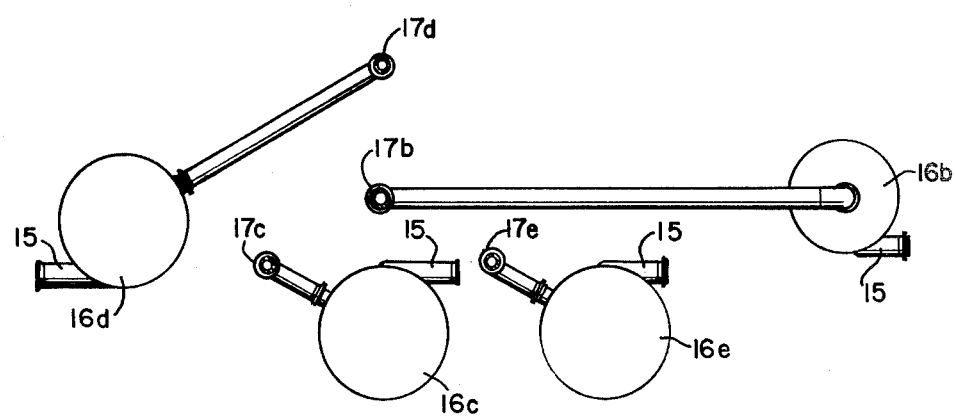
FIG. 5 is a horizontal sectional view taken approximately on the line 5—5 of FIG. 2.

Referring now to FIGS. 2, 4 and 5, a waste gas dispersion stack is there illustrated with a plurality of stack pipes for dispersing larger quantities of waste gas than with the stacks previously described.

A central vertical pipe 17b similar to the pipe 17 is provided, to which a pipe 55 from a knock-out drum 16b is connected. The knock-out drum 16b has a waste gas supply connection 15 extending thereto.

The pipe 55 and drum 16b are preferably disposed beneath a floor 56. The pipe 17b has a pipe 52 connected thereto as before, for the supply of fire suppressing material to the pipe 17b.

A plurality of upright pipes 17c, 17d and 17e are provided, similar to the pipe 17, but are spaced around the pipe 17b to provide a tower. The lower parts of the pipes 17c, 17d and 17e are in converging relation with vertical portions extending upwardly therefrom, braces 58 connected respectively to the pipe 17b providing rigidity. Platforms 59 with connecting ladders 60 may also be provided for access.

Each of the pipes 17c, 17d and 17e is connected, as before, to its knock-out drum 16c, 16d, 16e. The drums 16c, 16d and 16e have waste gas supply pipes 15 connected thereto and fire suppressant agent supply pipes 52c, 52d and 52e respectively connected thereto.

The pipe 17b has a discharge head 18 connected thereto with vanes 33 as previously described for the discharge of waste gas.

Each of the pipes 17c, 17d and 17e has a gas discharge head 18 mounted thereon and tilted outwardly as shown in FIG. 2 for better outward distribution of the gas around the streams from the inner vanes 33.

In order to sense the conditions at and upwardly beyond the vanes 33, a plurality of thermocouples TC are employed, enclosed within protective thermocouple mounting tubes 62 having viewing openings 63 and being carried on brackets 64 and 65.

Figure 9:
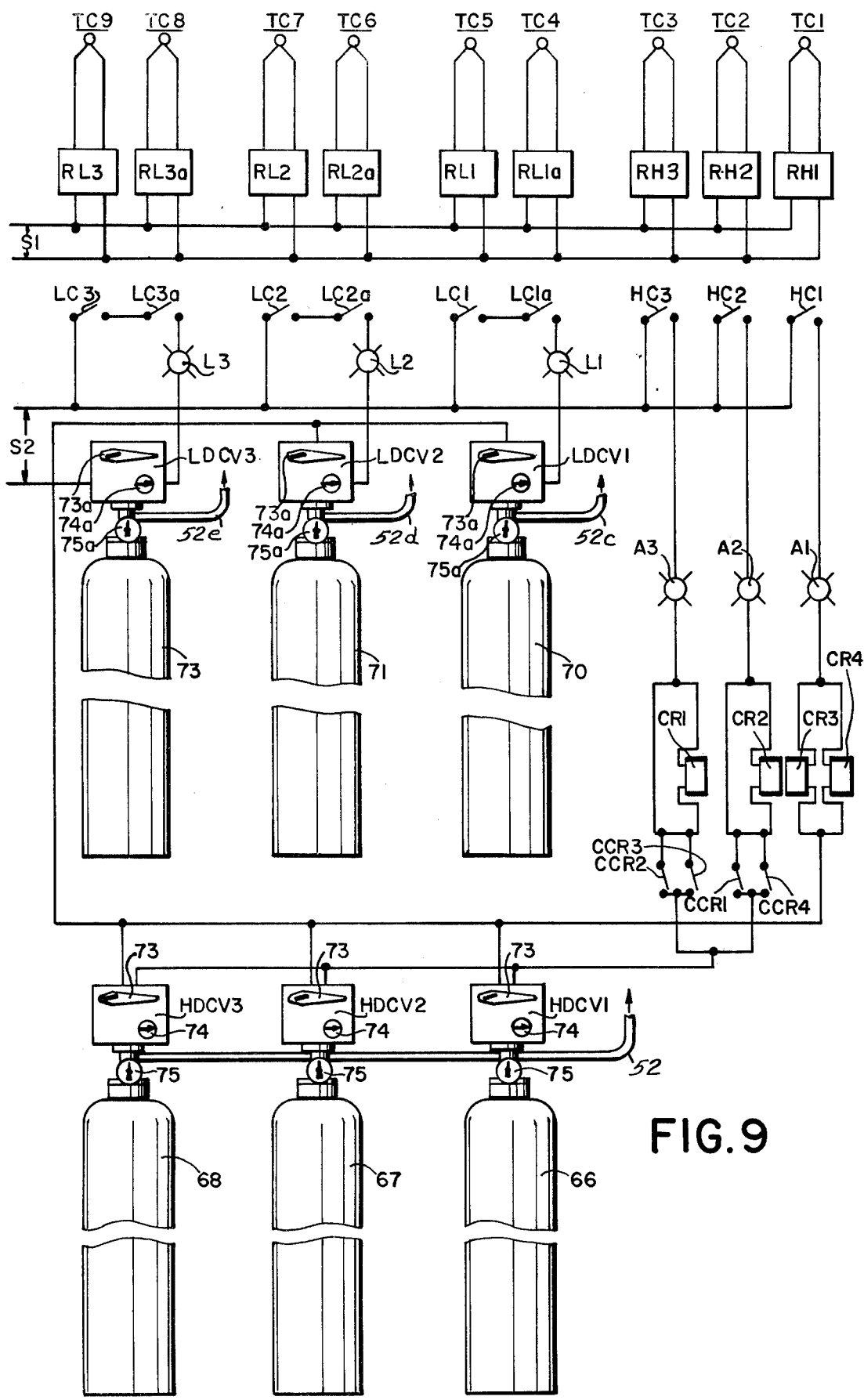
FIG. 9 is a diagrammatic view of control apparatus for the supply of fire suppressing material particularly related to the structure of FIGS. 2, 4 and 5.

Referring now to FIG. 9 a control system is there shown for the control of the delivery of fire suppressing medium in response to the conditions sensed by the thermocouples TC adjacent the vanes 33.

The large central dicharge head 18 on the pipe 17b has three thermocouples TC1, TC2 and TC3, (see FIG. 9) preferably equally spaced around the peripheries of the vanes 33. The thermocouples TC1, TC2 and TC3 are employed for the control of fire suppressing material at high pressure from high pressure sources 66, 67 and 68 through pipe 52 to the pipe 17b.

Additional pairs of thermocouples TC4 and TC5, TC6 and TC7, and TC8 and TC9 are provided on each discharge head preferably diametrically disposed as in FIG. 6 and 7 for each of the discharge heads 18 for the pipes 17c, 17d and 17e to control fire suppressing material at low pressure from the low pressure sources 70, 71 and 72.

The thermocouples TC4 and TC5 are connected to relays RL1 and RL1a, the thermocouples TC6 and TC7 are connected to relays RL2 and RL2a, the thermocouples TC8 and TC9 are connected to relays RL3 and RL3a and the thermocouples TC1, TC2 and TC3 are connected to relays RH1, RH2 and RH3, these relays being connected to a power source S1.

The relays RH1, RH2 and RH3 (see FIG. 9) respectively control contacts HC1, HC2 and HC3 which are normally open but are closed upon activation of their respective controlling thermocouples through indicator lamps A1, A2 and A3 and windings of relays CR1, CR2, CR3 and CR4, with bypass connections, for controlling corresponding contacts CCR1, CCR2, CCR3 and CCR4 so that upon energization of any two of the thermocouples TC1, TC2 and TC3 a signal will be supplied to valves HDCV1, HDCV2 or HDCV3 of the high pressure sources 66, 67 and 68 for the supply of fire suppressing material to the pipe 52. These valves have manual bypass controls 73, status indicators 74, and pressure indicators 75.

The relays RL1 and RL1a, RL2 and RL2a, RL3 and RL3a are connected to the power source S2 and respectively control contacts LC1 and LC1a, LC2 and LC2a, and LC3 and LC3a which are closed upon energization to illuminate signal lamps L1, L2 and L3, if both thermocouples of their controlling pair are energized, and energize valves LDCV1, LDCV2 and LDCV3 of the low pressure sources 70, 71 and 72 to supply fire suppressing material to the respective pipes 52c, 52d and/or 52e. These valves have manual bypass controls 73a, status indicators 74a, and pressure indicators 75a like the high pressure valves.

The mode of operation will now be pointed out.

In the form of the invention illustrated in FIGS. 1 and 3 waste gas to be dispersed is supplied through the pipe 15, and through the knock-out drum 16 and 16a where liquid is separated before the gas advances in the pipe 17 or 17a. If any small liquid particles are carried with the waste gas and not separated by the drum 16 or 16a the inclusion of the fluidic diode 29 with static prevention rings 30 eliminates any tendency to generate static electricity and also prevents air from entering the top of the stack.

As the waste gas advances upwardly in the tubular portion 27 of the discharge head 18 it passes outwardly through the openings 39 and into the vanes 33 and upwardly therein for discharge through the slots 42 at an angle to the vertical and in a vortex path.

The discharging gas exiting through the slots 42 entrains air along the outsides of the vanes 33 for mixture with the waste gas to dilute the waste gas and render it too lean for combustion or for explosion.

In the event that because of lightning or for some other cause the waste gas should be ignited at discharge and before it has been effectively dispersed then fire suppressing medium can be supplied to the pipe 17 manually controlled by the valve 53.

With the control system as shown in detail in FIG. 9 the thermocouples TC upon activation by heating attendant upon combustion of the discharging waste gas effect the delivery of fire suppressing medium at high pressure from the high pressure sources 66, 67 and 68 as desired or additionally from the low pressure sources 70, 71 and/or 72 as called for by the heat sensing thermocouples TC.

It will thus be seen that effective apparatus has been provided for discharge of waste gas in diluted non-combustible or non-explosive condition and with elimination of static electricity which might cause ignition and with provisions for rendering the waste gas non-flammable.

I claim:

1. A vent stack for waste gases comprising
an upright tubular member to which waste gas is delivered for discharge,
a discharge head at the terminal end of said tubular member and having discharge members for discharging waste gas in a plurality of separated streams in aspirating relation to the atmosphere for dilution of the discharging waste gas, and
means connected to a source of fire suppression material from the group consisting of carbon dioxide gas, dry fire suppression chemical with nitrogen propellant and halon, for delivering said material into the waste gas upstream of said discharge members.

2. A vent stack for waste gases comprising
an upright tubular member to which waste gas is delivered for discharge,
a discharge head at the terminal end of said tubular member and having discharge members for discharging waste gas in a plurality of separated streams in aspirating relation to the atmosphere for dilution of the discharging waste gas,
means for delivering fire suppression material into the waste gas upstream of said discharge members,
sensing means for sensing the temperature conditions at said vanes, and
members responsive to said sensing means for controlling said means for delivering said fire suppression material.

3. A vent stack for waste gases comprising
an upright tubular member to which waste gas is delivered for discharge,
a discharge head at the terminal end of said tubular member and having discharge members for discharging waste gas in a plurality of separated streams in aspirating relation to the atmosphere for dilution of the discharging waste gas,
means for delivering fire suppression material into the waste gas upstream of said discharge members,
additional tubular members having discharge heads for discharging waste gas for dispersion, and
said additional tubular members provide a support for said upright tubular member.

4. A vent stack as defined in claim 1 in which
said tubular member upstream of said discharge head has a fluidic diode for limiting back flow in said tubular member.

5. A vent stack as defined in claim 4 in which
said fluidic diode has surfaces to prevent static electricity generation by the advancing waste gas.

6. A vent stack as defined in claim 1 in which
said members for discharging waste gas comprise a plurality of hollow fixed vanes extending outwardly with respect to said tubular member and to the interiors of which said waste gas is delivered for discharge in said plurality of streams.

7. A vent stack as defined in claim 6 in which said vanes have spaced parallel side walls connected at the bottom by an upwardly and outwardly inclined bottom wall, said vanes having walls converging to provide nozzles with discharge openings and inducing air between said vanes for intimate mixture with the gas for dilution.

8. A vent stack as defined in claim 7 in which said nozzles are inclined.

9. A vent stack as defined in claim 1 in which a manually operable member is provided for controlling said last mentioned means.

10. A vent stack as defined in claim 1 in which additional tubular members are provided having discharge heads for discharging waste gas for dispersion.

11. A vent stack as defined in claim 10 in which additional means is provided for delivering fire suppression material for the discharge heads.

12. A vent stack as defined in claim 5 in which sensing means is provided for the discharge heads of each of said tubular members, and said sensing means controls members for delivering fire suppression material for said discharge heads.

13. A vent stack as defined in claim 12 in which a source of high pressure fire suppression material is provided for the discharge head of said upright tubular member, and a source of low pressure fire suppression material is provided for the discharge heads of said additional tubular members.

14. A vent stack as defined in claim 13 in which indicating members are provided responsive to the delivery condition of said sources.

* * * * *